United States Patent [19]

Yamamoto

[11] 4,321,893
[45] Mar. 30, 1982

[54] TWO-STROKE ENGINE HAVING VARIABLE EXHAUST PORT TIMING

[75] Inventor: Masahiro Yamamoto, Shizuoka, Japan

[73] Assignee: Yamaha Hatsudoki Kabushiki Kaisha, Japan

[21] Appl. No.: 177,581

[22] Filed: Aug. 13, 1980

[30] Foreign Application Priority Data

Aug. 17, 1979 [JP] Japan .................................. 54/105267

[51] Int. Cl.³ .......................... F02B 75/02; F02D 9/06
[52] U.S. Cl. ................................ 123/65 PE; 123/323;
123/73 R; 123/190 D; 123/65 V; 123/65 A
[58] Field of Search ............... 123/323, 65 PE, 65 PD,
123/65 V, 73 SP, 190 BE, 190 BC, 190 D, 73 R, 65 EM

[56] References Cited

U.S. PATENT DOCUMENTS

| | | | |
|---|---|---|---|
| 4,121,552 | 10/1978 | Mithuo et al. | 123/323 |
| 4,202,297 | 5/1980 | Oku et al. | 123/65 PE |
| 4,285,311 | 8/1981 | Iio | 123/323 X |

FOREIGN PATENT DOCUMENTS

199872  11/1938  Switzerland ......................... 123/323

*Primary Examiner*—Wendell E. Burns
*Attorney, Agent, or Firm*—Kerkam, Stowell, Kondracki & Clarke

[57] ABSTRACT

Two stroke engine having variable exhaust timing, which includes an exhaust timing control member disposed in the exhaust passage in the vicinity of the exhaust port. The control member is of an arcuately curved contour having diameter gradually decreasing from one end toward the other end so that it can readily be assembled in the cylinder simply by inserting from one side of the cylinder. The control member has a longitudinal axis which is inclined with respect to a line perpendicular to a line passing through the center axis of the cylinder and the center of the exhaust port so that the smaller diameter end is closer to the center axis of the cylinder than the large diameter end for making it possible to locate the arcuately curved contour of the control member substantially along the cylinder wall.

3 Claims, 3 Drawing Figures

TWO-STROKE ENGINE HAVING VARIABLE EXHAUST PORT TIMING

The present invention relates to two stoke internal combustion engines and more particularly to two stroke internal combustion engines having an engine cylinder formed with exhaust port means which is adapted to be controlled by a piston reciprocating in the cylinder.

In the aforementioned type of two stroke engines, the exhaust port means usually comprises an exhaust port which opens to the cylinder wall at a predetermined location so that it is closed and and/or opened by the piston at a predetermined timing in each cycle of operation. It has been known in this type of engines that the location of the exhaust port has very important effects on the engine output and pollutant emissions from the engines. In order to improve high speed engine performance, the timings of the exhaust port must be so determined that comparatively long port opening period can be ensured. However, such exhaust port timings have adverse effects on low speed engine performance. With such exhaust port timings, there will be a substantial decrease in the amount of charge of combustible air-fuel mixture in low speed engine operation so that the engine output will be undesirably decreased. Further, in low speed engine operation, appreciable amount of unburnt mixture allowed to flow out of the cylinder throuh the exhaust port during scavenging and compression stroke of the engine operation resulting in an increase in pollutant emission in the exhaust gas. When the exhaust port timings are so determined that the problems in low speed engine operation can substantially be eliminated, it becomes no longer possible to ensure satisfactory engine performance in high speed operation. Thus, in the conventional two stroke engines of the aforementioned type, it has been impossible to attain satisfactory results throughout the engine operating speed range.

In the U.S. Pat. No. 4,121,552, there are disclosed two stroke engines having an exhaust port timing control device comprising a rotary valve provided in the exhaust passage in the vicinity of the exhaust port for movement between an open and closed positions. In the closed position of the rotary valve, the exhaust port is partly closed so as to advance exhaust port timing and retard exhaust port opening timing. The rotary valve may be actuated in accordance with the engine throttle valve opening or the engine speed so that the valve is moved to the closed position under a low speed engine operation.

In the U.S. Pat. No. 4,202,297, there is disclosed an improved rotary valve structure having a rotary valve member located at the upper portion of the exhaust port. According to the patent, the valve member is of an arcuately concave profile with a diameter decreasing toward the intermediate portion thereof so that the profile lies substantially along the cylinder wall. The valve member further has a cut-off portion where the cross-section is of a part-circular configuration whereby the valve member can be moved to a retracted position so as to provide a smooth exhaust passage wall. In order to make it possible to install the valve member on the cylinder, the valve member is divided into two parts at the intermediate portion where the diameter is the smallest. The arrangement in accordance with the patent is therefore inconvenient in assembling because the divided parts have to be inserted respectively from the opposite sides of the cylinder and connected together at the inboard ends of the parts.

It is therefore an object of the present invention to provide an exhaust port timing control device for two-stroke engines, which can present a smooth exhaust passage wall in a retracted position but can be readily assembled by inserting the valve member only from one side of the cylinder.

According to the present invention, the above and other objects can be accomplished by a two-stroke internal combustion engine comprising cylinder means having cylinder wall means formed with exhaust port means and scavenging port means each having a center, said cylinder wall means defining a cylinderical cavity having a central axis, piston means disposed in said cylinder means for movement so that the exhaust and scavenging port means are cyclically closed by said piston means, exhaust passage means communicating with said exhaust port means, scavenging passage means, communicating with said scavenging port means for passing fresh charge of intake gas into the cylinder means when the scavenging port means is opened by the piston means, exhaust port timing control means provided in said exhaust passage means adjacent to said exhaust port means, said exhaust port timing control means including a rotary control member having a general configuration in which diametrical dimension is gradually decreased from one end toward the other end to provide an external contour of an arcuate sectional configuration, said rotary control member having an axis inclined with respect to a line perpendicular to a line passing through the central axis of the cylinder means and the center of the exhaust port means so that said other end of the rotary control member is closer to the central axis of the cylinder means than the one end, said rotary control member being partially cut-off to conform in configuration to the exhaust passage means and being movable between a retracted position wherein the cut-off is aligned with the exhaust passage means and a projected position wherein an edge of the cut-off is projected into the exhaust passage means.

According to the features of the present invention, the rotary control member can readily assembled in position by inserting it from one side of the cylinder means. In the retracted position of the control member, a smooth wall surface is provided in the exhaust passage by the cut-off so that the flow of exhaust gas will not be disturbed. As in the previously discussed patents, the control valve member in the present invention may be rotated in accordance with the engine speed so that the exhaust port timing is suitably determined throughout the operating range of the engine.

In order that the above and other objects and features of the present invention be understood more clearly, discriptions will now be made with reference to a preferable embodiment which is shown in the accompanying drawings, in which.

Figure 1:
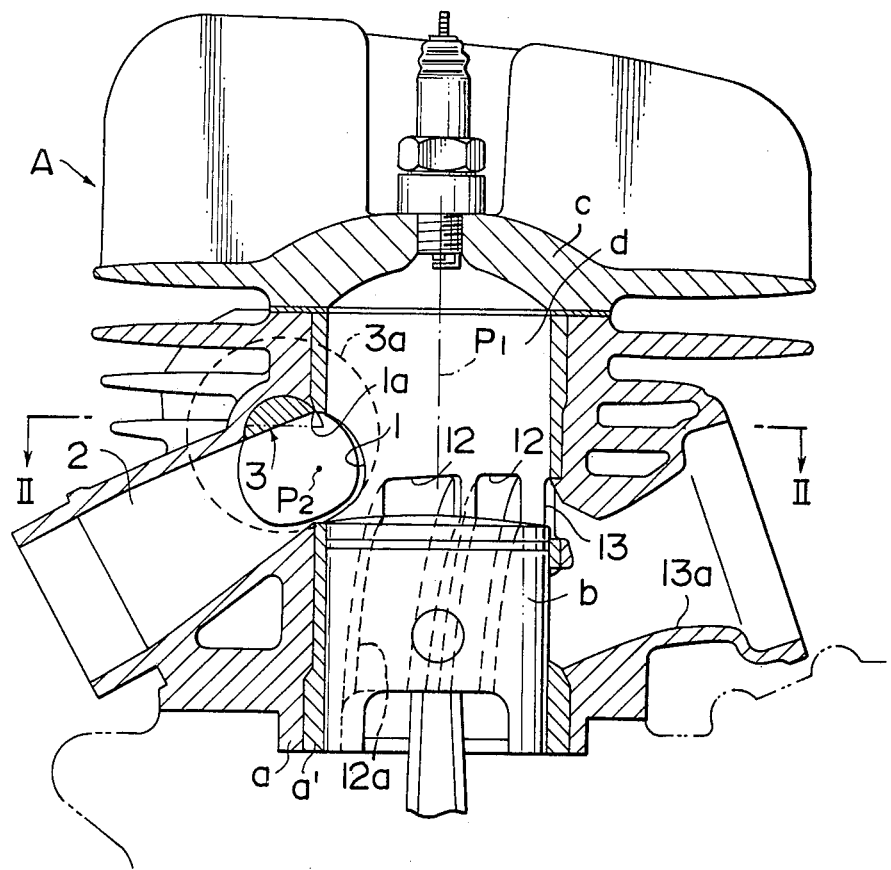
FIG. 1 is a vertical sectional view of a two stroke engine in accordance with one embodiment of the present invention.
Figure 2:
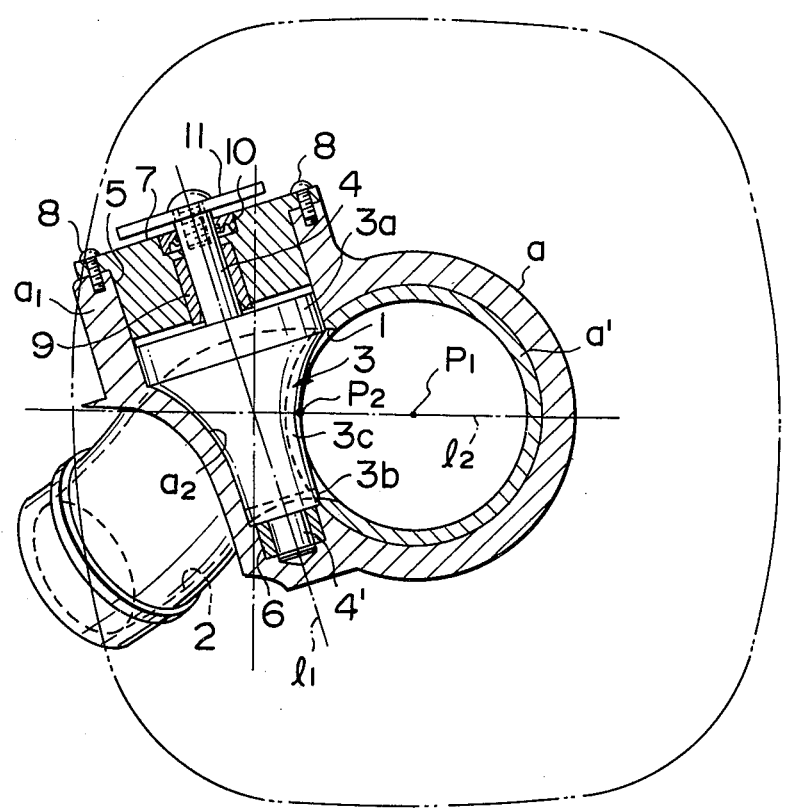
FIG. 2 is a horizontal section of the engine taken substantially along the line II—II in FIG. 1.

Referring now to the drawings particularly to FIGS. 1 and 2, there is shown a two stroke engine comprising a cylinder a lined with a sleeve a′ having a cylinder bore, a piston b which is disposed in the cylinder bore for reciprocating movement, and a cylinder head c secured to the top end of the cylinder a. Thus, a combustion chamber d is defined by the cylinder a, the piston b and the cylinder head c. An ignition plug d is mounted on the cylinder head c as in conventional engines. The cylinder 1 and the cylinder head 3 are respectively provided with cooling fins.

The cylinder a is formed with an exhaust port 1 communicating with an exhaust passage 2 as well as a plurality of scavenging ports 12 communicating with scavenging passages 12a. Further, the cylinder a is also formed with an intake port 13 leading from an intake passage 13a. As well known in the art, the ports 1 and 12a are cyclically closed by the piston 2 reciprocating in the cylinder bore. The port opening timings are therefore determined by the heightwise locations of the ports. In FIG. 2, it will be noted that the exhaust passage 2 is curved sidewardly in the vicinity of the exhaust port 1 and then obliquely downwardly to provide a space a, for an exhaust port timing control device.

Figure 3:
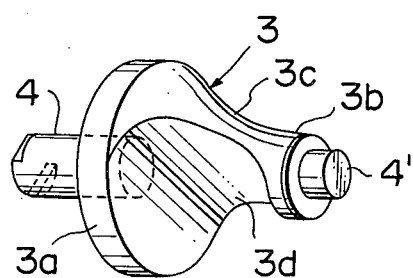
FIG. 3 is a perspective view of the rotary control member used in the engine shown in FIGS. 1 and 2.

As shown in FIGS. 1 and 2, the cylinder a is formed at the upper portion of the exhaust passage 2 in the vicinity of the exhaust port 1 with a recess a2 for receiving a rotary control member 3. In FIG. 3, it will be noted that the control member 3 has a large diameter end 3a, a small diameter end 3b and an intermediated curved portion 3c which has a diameter gradually decreasing from the large diameter end 3a to the small diameter end 3b to provide an arcuately concave configuration. The intermediate portion 3c of the control member 3 is of a curvature which is slightly larger than that of the cylinder bore. As shown in FIG. 2, the control member 3 has an axis $l_1$ which is inclined with respect to a line perpendicular to a line $l_2$ passing through the center axis $P_1$ of the cylinder bore and the center $P_2$ of the exhaust port 1. Thus, the small diameter end 3b is located closer to the center axis $P_1$ of the cylinder bore than the large diameter end 3a whereby the intermediate portion 3c of the control member 3 lies substantially along the inner wall of the cylinder bore.

The control member 3 is formed with axially aligned stub shafts 4 and 4' projecting axially from the ends 3a and 3b, respectively. The stud shaft 4' projecting from the small diameter end 3b is journalled by a bearing 6 and the stub shaft 4 at the other end is rotatably supported by a plug member 7 through a bearing 9. As shown in FIG. 2, the recess a2 is contiguous at an end adjacent to the large diameter end 3a of the control member 3 with a cylindrical bore 5 and the plug member 7 is fitted to the bore 5. The plug member 7 is secured to the cylinder a by means of screws 8. Between the stub shaft 4 and the plug member 7, there may be provided an oil seal 10. The stub shaft 4 extends beyond the plug member 7 and an actuating lever 11 is secured to the outer end of the shaft 4. It will therefore be understood that the control member 3 can be mounted in position by inserting it through the cylindrical bore 5 into the recess a2. Thereafter, the plug member 7 is fitted to the cylindrical bore 5 and secured to the cylinder a by the screws 8.

Referring to FIG. 3, it will be noted that the control member 3 has a cut-off 3d at the intermediate portion 3c. The cut-off 3d is so shaped that it conforms with the upper part of the cross-sectional configuration of the exhaust passage 2 where the control member 3 is mounted. Therefore, it is possible to located the control member in a retracted position where the cut-off 3d lies along the wall surface of the exhaust passage 2 to provide a smooth passage as shown in FIG. 1. When the control member 3 is rotated from the retracted position counterclockwise as seen in the plane of FIG. 1, an edge of the cut-off 3d in the control member 3 projects into the exhaust port 1 so as to change the port timing. The projected position of the control member 3 is shown by phantom lines in FIG. 1. It will be understood that the lever 11 on the shaft 4 of the control member 3 may be connected with the engine throttle lever so that the control member 3 is actuated in accordance with the engine load. Alternatively, a governor may be provided for actuating the control member in accordance with the engine speed.

The invention has thus been shown and described with reference to a specific embodiment, however, it should be noted that the invention is in no way limited to the details of the illustrated structures but changes and modifications may be made without departing from the scope of the appended claims.

I claim:

1. A two-stroke internal combustion engine comprising cylinder means having cylinder wall means formed with exhaust port means and scavenging port means each having a center, said cylinder wall means defining a cylindrical cavity having a central axis, piston means disposed in said cylinder means for movement so that the exhaust and scavenging port means are cyclically closed by said piston means, exhaust passage means communicating with said exhaust port means, scavenging passage means communicating with said scavenging port means for passing fresh charge of intake gas into the cylinder means when the scavenging port means is opened by the piston means, exhaust port timing control means provided in said exhaust passage means adjacent to said exhaust port means, said exhaust port timing control means including a rotary control member having a general configuration in which diametrical dimension is gradually decreased from one end toward the other end provide an external contour of an arcuate sectional configuration, said rotary control member having an axis inclined with respect to a line perpendicular to a line passing through the central axis of the cylinder means and the center of the exhaust port means so that said other end of the rotary control member is closer to the central axis of the cylinder means than the one end, said rotary control member being partially cut-off to conform in configuration to the exhaust passage means and being movable between a retracted position wherein the cut-off is aligned with the exhaust passage means and a projected position wherein an edge of the cut-off is projected into the exhaust passage means.

2. A two stroke engine in accordance with claim 1 in which said control member is provided with a stub shaft projecting axially from said one end and rotatably supported by bearing means on the cylinder means, said stub shaft projecting outwardly from said cylinder means so that an actuating lever can be fitter thereto.

3. A two stroke engine in accordance with claim 2 in which said bearing means is carried on plug means which is fitted to a correspondingly shaped bore in the cylinder means.

* * * * *